Sept. 30, 1969 M. L. AVIGNON 3,470,488

AUTOMATIC FREQUENCY ACQUISITION CIRCUIT FOR A PHASE LOCKED LOOP TYPE OF SYNCHRONIZING SYSTEM

Filed Oct. 26, 1967 2 Sheets-Sheet 1

Inventor
MICHEL L. AVIGNON
By Alfred C. Hill
Agent

Inventor
MICHEL L. AVIGNON
By Alfred C. Hill
Agent 3,470,488

AUTOMATIC FREQUENCY ACQUISITION CIRCUIT FOR A PHASE LOCKED LOOP TYPE OF SYNCHRONIZING SYSTEM

Michel Louis Avignon, Neuilly, France, assignor to International Standard Electric Corporation, New York, N.Y., a corporation of Delaware Filed Oct. 26, 1967, Ser. No. 678,277
Int. Cl. H03b 3/04
U.S. Cl. 331—4 8 Claims

ABSTRACT OF THE DISCLOSURE

An integrating frequency discriminator produces a control voltage when the frequency of clock pulses is outside the lock-in frequency range of a phase lock loop used to synchronize the frequency of clock pulses to the frequency of reference pulses. A bistable device employs this control voltage as its supply voltage and is triggered in response to the loop control signal. When the bistable is triggered to one stable state, the loop control signal is swept in one direction and when triggered to the other stable state the loop control signal is swept in the opposite direction to dispose the frequency of clock pulses in the lock-in frequency range.

BACKGROUND OF THE INVENTION

This invention relates to synchronizing systems and more particularly to an automatic frequency acquisition circuit for a phase locked loop type of synchronizing system.

A phase locked loop and its associated frequency acquisition circuit is normally used to synchronize two trains of periodic signals, or one train of periodic signals and one train of random signals of the same rated frequency. This last relationship of signals characterizes in particular the signals used in the digital transmission of PCM (pulse code modulation) data.

Where two trains of signals of the same frequency, or of frequencies very close to each other produced by independent sources, referred to as input signals and clock signals, are employed, the phase locking consists of maintaining the two trains of signals in a predetermined phase relation by acting on the frequency or phase of one of the trains of signals.

In order to control the frequency of the signals, phase error information is generated by means of a phase detector operating on rectangular signals derived from the input and clock signals and delivering pulse width modulated signals which are applied to an element presenting a transfer characteristic of a low pass filter which is frequently called an "extrapolator" or a "data hold" circuit. This element delivers an amplitude modulated signal, the average value of which represents the phase difference between the input and clock signals and is applied to the clock signal generator in such a way as to cancel the error and to lock the signals in phase. The extrapolator is defined by a cut-off frequency $Fbm$ beyond which its insertion loss is such that the phase locking is no longer assured.

Thus, the phase locked loop behaves as a low pass filter with a very narrow bandpass which automatically centers on the frequency of the input signal and enables the cancelling of the jitter and frequency drift of the input signals.

However, the phase locking may be lost because of the narrowness of the bandpass when a sudden disturbance affects one of the trains of signals, or when the equipment is started. Thus, it is necessary to provide a frequency acquisition circuit in which a frequency discriminator generates a signal indicating the unlocking or "desynchronization." This signal controls a scanning, by the clock generator, of the range of frequencies that can be occupied by the input signals. This operation is carried on up to the time where the bit frequency $Fb$ between the compared signals becomes lower than $Fbm$. At this time, the phase lock circuit may assure once again the control of the synchronization.

SUMMARY OF THE INVENTION

An object of the present invention is to provide a synchronization system wherein the synchronization is maintained by acting on the frequency of the clock signals.

Another object of the present invention is to provide a phase lock circuit for two trains of signals, one of which is constituted by periodic signals and the other of which is constituted either by periodic signals, or by random signals.

A further object of the present invention is to provide a synchronizing system having an improved automatic frequency acquisition circuit for a phase lock loop.

A feature of this invention is the provision of a system to synchronize the frequency of a first signal to the frequency of a second signal comprising a phase lock loop having a given frequency range within which the frequency of the first signal can be synchronized to the frequency of the second signal including a voltage controlled oscillator generating the first signal, a source of second signal, and first means coupled to the oscillator and the source to produce a first control signal proportional to the phase relationship between the first and second signals for frequency control of the oscillator to establish the desired synchronized condition; and an automatic frequency acquisition circuit including second means coupled to the oscillator and the source to produce a second control signal indicative of the relationship of the frequency of the first signal and the given frequency range, and third means coupled to the first means and the second means responsive to the first and second control signals to produce at least a third control signal when the second control signal indicates the frequency of the first signal is outside the given frequency range, the third control signal varying the magnitude of the first control signal to sweep the frequency of the first signal through the given frequency range to enable the phase lock loop to establish the desired synchronized condition.

Another feature of this invention is the provision of a bistable device providing the third means of the preceding paragraph whose supply voltage is supplied by the second control signal and is supplied by triggered voltage from the first control signal, a third control signal being produced when the bistable device is triggered to its "0" state and a fourth control signal being produced when the bistable device is triggered to its "1" state. The third control signal increases the magnitude of the first control signal to increase the frequency of the first signal and the fourth control signal decreases the magnitude of the first control signal to decrease the frequency of the first signal, the third control signal being produced when the frequency of the first signal is less than the lower frequency limit of the given frequency range and the fourth control signal is produced when the frequency of the first signal is equal to or greater than the upper frequency limit of the given frequency range.

BRIEF DESCRIPTION OF THE DRAWING

The above mentioned and other features and objects of this invention will become more apparent by reference to the following description taken in conjunction with the accompanying drawings, in which:

FIGS. 4*a*, 4*b*, 4*c* and 4*d* illustrate the same signals as those of FIGS. 2*a* to 2*d* when the input signal C and the clock signals H are synchronized;

FIGS. 6*a*, 6*b* and 6*c* illustrate voltages and signals appearing in the frequency search circuit FS of FIG. 1.

DESRIPTION OF THE PREFERRED EMBODIMENT

Figure 1:
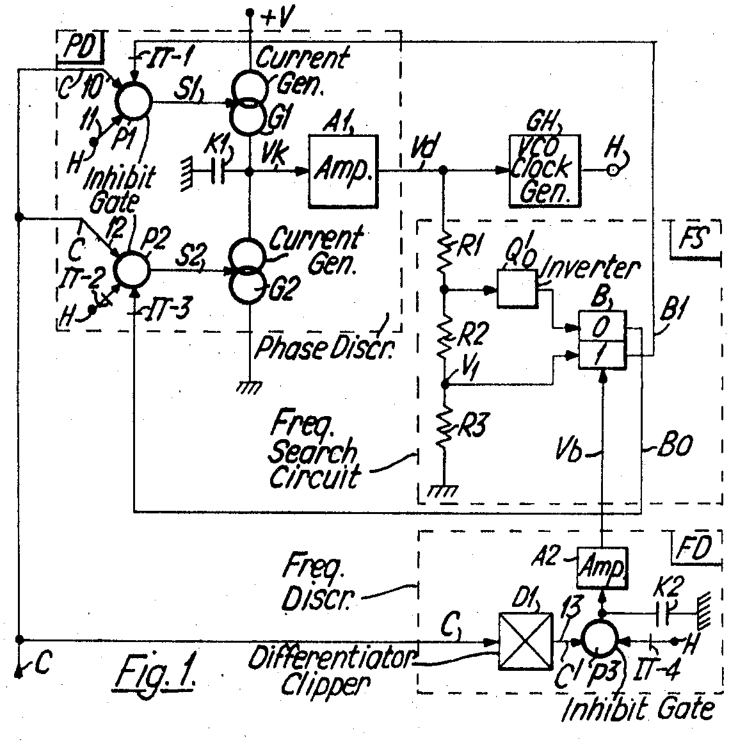
FIG. 1 is a block diagram illustrating the synchronizing system in accordance with the principles of this invention.

FIG. 1 illustrates the block diagram of an embodiment of the synchronizing system in accordance with the principles of this invention in which the signals compared are referenced C for input signals of frequency FC and H for the clock signals of frequency FH delivered by voltage controlled oscillator GH. These signals are illustrated respectively in FIGS. 2*a* and 2*b*. The system comprises the following elements: phase discriminator PD, frequency discriminator FD, and frequency search circuit FS. Phase discriminator PD receives rectangular signals C and H and delivers a control voltage for clock generator GH. This voltage reference V*d* assures the locking in phase quadrature of the signals C and H as long as $Fb<Fbm$. Frequency discriminator F*d* receives the same signals as discriminator PD and delivers a voltage V*b* when $Fb>Fbm$. Frequency search circuit FS is put into operation when the voltage V*b* reaches an amplitude sufficient for assuring the operation of flip flop B which delivers a signal B1 or B0 according to whether $FH>FH1$, or $FH<FH0$, the range of frequencies FH0–FH1 being that which can be occupied by the input signals. Signals B1 and B0 control, through phase discriminator PD, the variation of voltage V*d* in such a way as to scan the range of frequencies FH0–FH1.

Phase discriminator PD comprises INHIBIT gates P1 and P2, current generators G1 and G2 which are identical and which are triggered by the signals S1 and S2 delivered by INHIBIT gates P1 and P2, capacitor K1 and a unit gain, high input impedance amplifier A1. These last two elements constitute the extrapolator, the role of which has been defined hereinabove. Gate P1 includes terminal 10 coupled to input pulses C, terminal 11 coupled to generator GH, and inhibit terminal IT–1 coupled to the "1" output of flip flop B. Gate P2 includes terminal 12 coupled to input pulses C, inhibit terminal IT–2 coupled to generator GH and inhibit terminal IT–3 coupled to the "0" output of flip flop B.

Gates P1 and P2 are activated by the logical conditions: $S1=CH\overline{B1}$ and $S2=C\overline{H}\overline{B0}$. Since one of these logic equations comprises the condition H and the other the condition $\overline{H}$, it is seen that only one of the gates P1 and P2 is activated at a given moment. It will be assumed, in order to describe circuit PD, that signals B1 and B0 are absent so that the operation of circuits P1 and P2 depends only upon the signals C and H. A positive phase angle $\varphi$ measures the time lag of the leading edge of signal C with respect to the leading edge of signal H as illustrated in FIGS. 2*a* and 2*b* with these signals having a duration equal to half of the repetition period.

Figure 2:
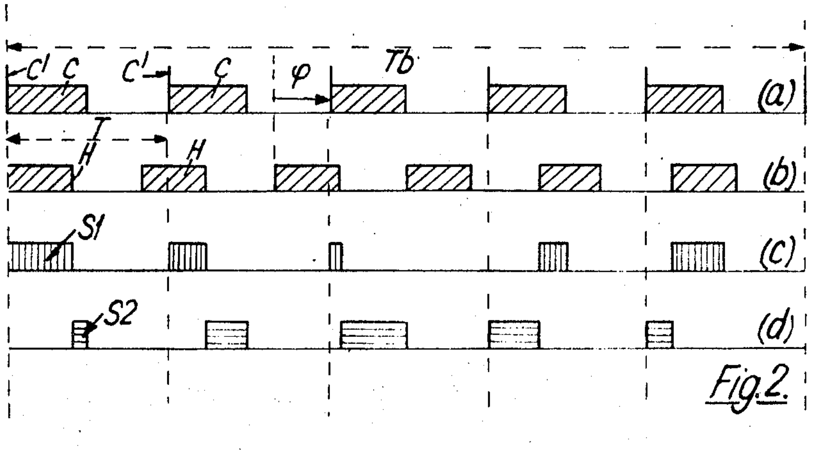
FIGS. 2*a*, 2*b*, 2*c* and 2*d* illustrate curves of signals present in the system of FIG. 1 in one case of desynchronization.

FIGS. 2*a* and 2*b* illustrates a bit period $Tb=1/Fb$ between the signals in the case where $\varphi$ increases which corresponds to $FH>FC$. During this period, signals C and H present all the possible values of relative phase angle although its duration has been chosen very short in order to simplify the figure.

Figures 3, 4:
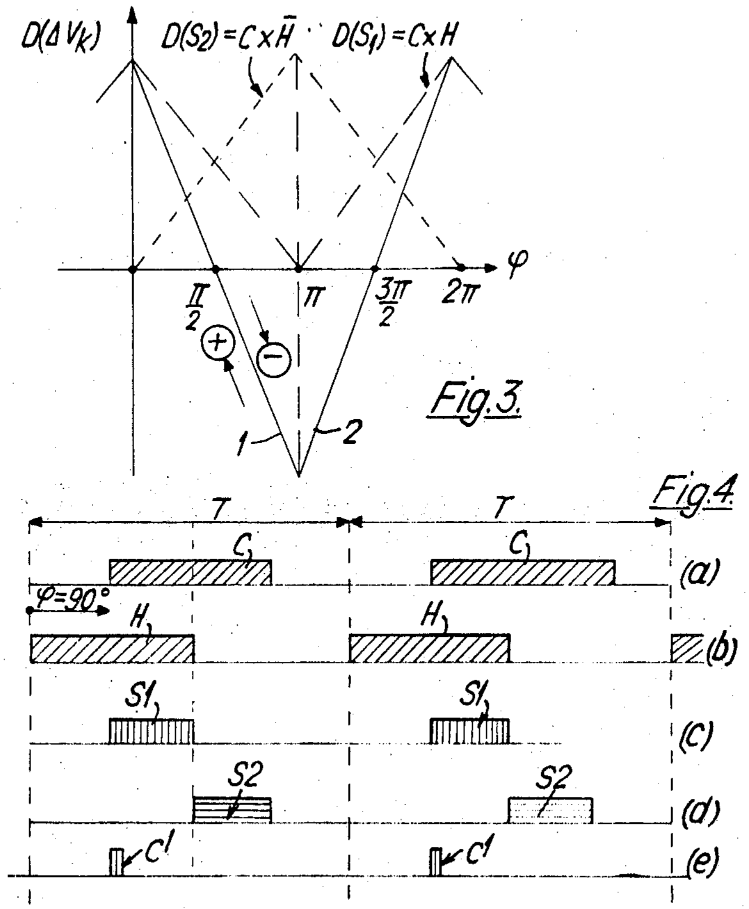
FIG. 3 illustrates the characteristic of the phase discriminator of FIG. 1.

FIGS. 2*c* and 2*d* represent the signals S1 and S2 of constant amplitude delivered by gates P1 and P2 (FIG. 1). The width of these signals which are referenced, respectively, D (S1) and D (S2) vary linearly in relation with the phase angle $\varphi$. The characteristic curves $D(S1)=f(\varphi)$ and $D(S2)=f(\varphi)$, shown in dotted lines in FIG. 3, give the rate of this variation. It will be observed that these two curves are in phase opposition, so that the average value of the charge and of the discharge of condenser K1 is represented by the full line curve of FIG. 3 obtained by substracting the curve D (S2) from the curve D (S1).

The circuit constituted by condenser K1 and by amplifier A1 (FIG. 1) is equivalent to an integrator, so that this full line curve of FIG. 3 represents at each repetition period, T, the variation $\Delta Vk$ of the potential across the terminals of condenser K1 in relation with the phase angle $\varphi$ with $\Delta Vk=0$ or $\varphi'=\alpha\pi/2$ (with $\alpha=1$ or 3). Thus, the error signal is zero for $\varphi=\varphi'$ and the signals C and H are then synchronized in phase quadrature.

The effect of phase disturbances on these circuits will now be discussed assuming that the signals are initially phase locked with $\varphi'=+90°$.

If a phase shift $\varphi$ takes place such that $$+90°<\varphi<+180°$$

which corresponds to an increase of the frequency FH, that is, $FH>FC$, the phase detector controls, as it may be seen from FIG. 3, a discharge of condenser K1 since there will be an output from gate P2 and no output from gate P1 thereby rendering current generators G2 conductive and current generator G1 non-conductive. Voltages V*k* and V*d* decrease with the voltage V*d* acting on generator GH to reduce the frequency FH. Thus, it is seen that for $\varphi'=+90°$ generator GH must be designed in such a way that FH increases with V*d* and reversely. In one or several periods T, a value of FH is reached such that $FH=FC$ and $\Delta k=0$. In a similar way, a phase shift of the same amplitude but characterizing a decrease of frequency FH, that is, $0°<\varphi<+90°$, controls an increase of the frequency FH by providing an output from gate P1 to trigger current generator G1 and no output from gate P2 rendering current generator G2 inoperative causing an increase in V*d* resulting in the desired increase of FH and the resultant phase locking. These relationships between the direction of the phase shift and the sign of the variation of FH have been shown symbolically on FIG. 3 by means of the arrows and the signs "−" and "+" along part 1 of the solid curve.

When the phase angle reaches a value $\varphi$ such that $180°<\varphi<270°$ (this may take place if the increase of frequency FH is sufficiently fast so that the correction described hereinabove has no time to act), phase detector PD controls the discharge of condenser K1 and the decrease of voltages *Vk* and *Vd*, thus, inducing a decrease of frequency FH up to the time where the synchronism is reached. When the phase angle ranges between 270° and 360°, the correction may be made but a loss of information will take place, the synchronism being then obtained for: $\varphi'=90°+2k\pi$.

In the case where $FH>FC$, which has just been described, the operation point of circuit PD moves over the characteristic 1–2 of FIG. 3 in the direction of the arrow bearing the sign "−." In the case where $FH<FC$, it is sufficient to assign respectively FIGS. 2*a* and 2*b* to the signals H and C in order to see that the operating point moves in the direction of the arrow carrying the sign "+" and that the phase disturbances are corrected in a similar way.

In the above description, it has been assumed that signals C and H are periodic and that both had a duty cycle 0.5. In fact, the circuit also operates when the signals C are received randomly as in the case of PCM and for different duty cycle factors.

In fact, when there is no signal C, the generators G1 and G2 are both blocked and no signal $\Delta Vk$ is obtained during the corresponding period T. But the first signal C which occurs yields exact information about the phase shift and the correction is carried out in a normal manner if the loop gain presents a sufficiently high value.

When the duty cycle factors of signals C or H are different from 0.5, either because of the way of designing generators, or because signals C are effected by a phase jitter, the circuit still operates correctly. In this condition, the peaks of the triangular curves S1 and S2 are flattened and in the phase lock condition, the trailing edge of signal H coincides with the center of the signal C, the phase angle $\varphi'$ being different than 90°.

When $Fb$ increases in such a way that the operating points move over a succession of triangular curves similar to those of FIG. 3, the amplitude of the signal $\Delta Vk$ tends toward zero owing to the characteristic of the extrapolator so that voltage $Vk$ remains practically constant and can no longer control the frequency FH; the phase locking is then lost and it is necessary to detect this desynchronization in order to control voltage $Vk$ to reestablish synchronization.

The detection of desynchronization is carried out in frequency discriminator FD which comprises differentiating and clipping circuit D1 delivering a positive signal C′ time coincident with the leading edge of signal C as illustrated in FIGS. 2a and 4e, INHIBIT gate P3 which is activated for the logical condition $C'\overline{H}$, integration capacitor K2 and high input impedance amplifier A2. Gate P3 includes terminal 13 coupled to circuit D1 and inhibit terminal IT–4 coupled to generator GH.

FIGS. 4a and 4b represent the respective positions of signals C and H when they are phase locked with $\varphi'=+90°$. It will be observed in FIGS. 4b and 4e that gate P3 does not deliver any signals in this synchronized situation. However, when the signals are not phase locked, gate P3 is activated and with $FH>FC$, as illustrated in FIGS. 2a to 2d, it delivers a pulse at each period T of the second half of the bit period $Tb$. In the opposite case, where $FH<FC$, which occurs in particular when $Vk$ is approximately equal to zero, these pulses appear during the first half of $Tb$.

Frequency search circuit FS comprises, in the simplified embodiment of FIG. 1, flip flop B, inverter Q′0 and resistors R1, R2 and R3; potentials, with respect to ground, of the common points of the resistances R1–R2 and R2–R3 being referenced V′0 and V1, respectively.

Flip flop B has its supply voltage supplied by voltage $Vb$ delivered by circuit FD and it operates only when this voltage exceeds a threshold value $Vbm$, the signals B0 and B1 having both a value of zero below this threshold value.

Pulses delivered by gate P3 when signals C and H are desynchronized charge condenser K2 and the output voltage $Vb$ of the circuit FD, which was zero at synchronism, increases. For $Vk\simeq Vd\simeq 0$, frequency FH is substantially different from FC ($FH<<FC$, see FIG. 6a) so that the bit period $Tb$ between these signals is very short and gate P3 delivers at each period $Tb$ only a relatively small number of signals. The voltage $Vb$ increases, during one half of the bit period $Tb$ with a slope defined by the time constant of the charge circuit of condenser K2 and, during the following half of the bit period $Tb$, it decreases with a slope defined by the time constant of the discharge circuit of this condenser. The first of these time constants is chosen very low, in such a way that the scanning may start for small values of $Tb$ and the second time constant is chosen lower than $Tbm$ ($Tbm=1/Fbm$) in such a way that the voltage $Vb$ may become zero only when $Fb<Fbm$.

Figures 5, 6:
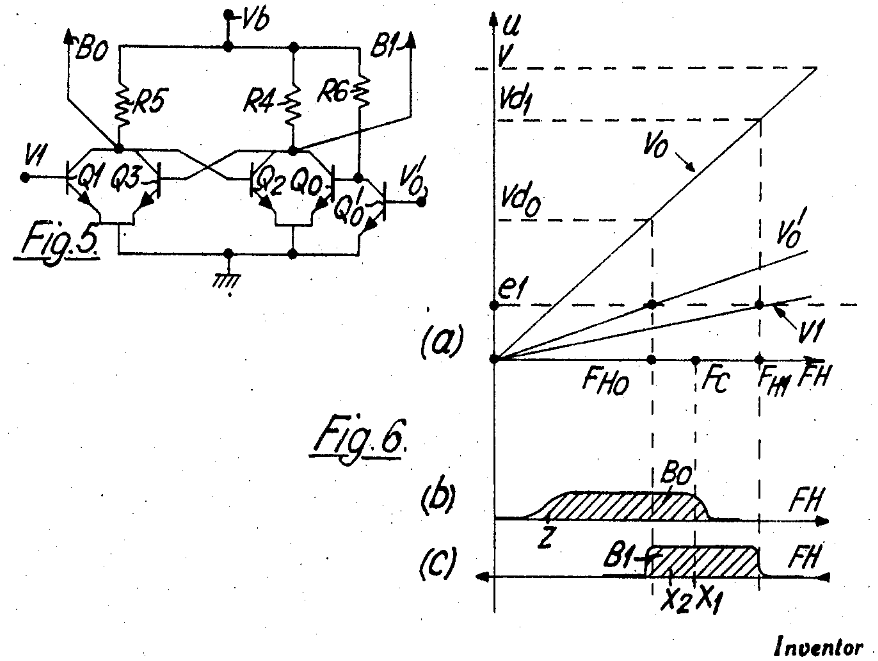
FIG. 5 is a schematic diagram of flip flop B of FIG. 1.

In order to facilitate the description of the operation of circuit FS, FIG. 5 illustrates a schematic diagram of an embodiment of flip flop B and inverter Q′0 and FIG. 6a illustrates the relationship between voltages $Vd$, V0, V′0, V1 and frequency FH, the variation of voltage $Vd$ being assumed linear in order to simplify the figure.

Flip flop B comprises two pairs of transistors Q0–Q2 and Q1–Q3 which may be realized with a NOR gate in integrated circuits, and resistors R4 to R6. In such a circircuit, the supply voltage $Vbm$ is a small value (3 volts, for instance,) so that direct feedback connection may be established. Flip flop B will be in the "0" state when transistor Q2 is saturated (B1=0, B0=1) and will be in the "1" state when transistor Q3 is saturated (B1=1, B0=0).

Inverter Q′0 is constituted by one single transistor bearing the same reference and its collector is directly connected to the base of transistor Q0.

If $e1$ ($e1\simeq 0.6$ volt) designates the threshold voltage for each of the transistors, it is seen that: (1) flip flop B sets to the "0" state as soon as $V'0\leq e1$. Under these conditions $B0=Vbm$ ("1") and $B1\simeq 0$ ("0"); and (2) flip flop B sets to the "1" state as soon as $V1\geq e1$. Under these conditions $B1=Vbm$ ("1") and $B0\simeq 0$ ("0").

FIG. 6b represents the amplitude of signal B0 with respect to frequency FH when $Vd$ increases starting from a value $Vd\leq Vd0$ and FIG. 6c represents the value of the signal B1 with respect to the frequency FH when $Vd$ decreases starting from a value $Vd\geq Vd1$. Since frequencies FH0 and FH1 are fixed the straight line characteristics of voltages V′0 and V1 (FIG. 6a) are determined by the points of coordinates (FH0, $e1$) and (FH1, $e1$) enabling the calculation of the values of resistors R1, R2, R3.

When the circuits are just energized, $Vd=Vb=0$, and signals B0 and B1 have an amplitude of zero, the frequency scanning is carried out in the following way: gates P1 and P2 are activated alternately, as has been previously discussed, the average value of the current of condenser K1 being zero owing to the high value of the beat frequency so that $Vd$ remains equal to zero. Circuit FD begins to deliver pulses and the voltage $Vb$ starts increasing. As soon as $Vb$ reaches a value $Vbm$, slightly higher than $e1+e2$ ($e2$ being the collector to emitter voltage of saturated transistor), flip flop B starts operating such as at point Z, FIG. 6b, and sets to its "0" state delivering a signal B0 in its "1" condition which is applied to inhibit terminal IT3 which blocks gate P2. From this time on, gate P1 is activated each time condition CH is satisfied since the signal B1 applied to inhibit terminal IT1 of gate P1 is in condition "0." Under these conditions potential $Vk$ of condenser K1 increases as does the voltage $Vd$. When $Vd=Vd0$, generator GH delivers signals at the minimum frequency FH0 (see FIG. 6a). From this point on the frequency of the clock pulses increases towards the maximum value FH1 so that there is a progressive reduction of the beat frequency $Fb$ between the signals C and H. The increase in voltages $Vk$ and $Vd$ is due to the fact that there is an output S1 from gate P1 to trigger generator G1 for charging condenser K1. When $Fb<Fbm$ the duration of the beat half period during which gate P3 does not deliver signals becomes sufficiently high to allow the discharge of condenser K2 up to the time where flip flop B is no longer supplied with supply voltage $Vb$. Signals B0 and B1 will then have a value of zero volts and the circuit PD starts to operate again in its normal manner to assure the phase locking at the frequency $FC=FH$ corresponding to the abscissa X1 (FIG. 6b).

If, owing to any disturbance, the phase locking is not obtained at point X1, voltage $Vd$ continues to increase up to the value $Vd1$ corresponding to the maximum frequency FH1 of generator GH. For this value of $Vd$, flip flop B sets to the "1" state due to the value of V1 being greater than the inverted value of V′0 at the output of inverter Q′0. When in this condition flip flop B delivers a signal B1 having a condition of "1" (FIG. 6c). This signal is applied to inhibit terminal IT1 of gate P1 and blocks the same while gate P2 receives a signal B0 in the "0" condition on inhibit terminal IT3 which activates gate P2 each time the condition $C\overline{H}$ is satisfied (where H is applied to inhibit terminal IT2). Voltage $Vd$ starts decreasing since current generator G2 is activated to discharge condenser K1. This decreasing of $Vd$ continues and the frequency of the clock pulses from generator GH decreases towards the value FH0 and the range of frequencies is scanned once again.

If signals H have drifted up to the frequency corresponding to the abscissa X2 (FIG. 6c), flip flop B does not receive any control signal and when the voltage V$b$ is sufficient, it sets either to the "1" or "0" state so that V$d$ may either decrease or increase. If it is assumed that flip flop B has set to the "1" state, FH decreases to the value FH0, then the flip flop changes its state due to the increased potential supplied by inverter Q'0 and signal B0 controls an increase of this frequency in such a way as to once again find the frequency $FH=FC$ corresponding to the abscissa X1.

The phase lock loop just described does not require any setting and it uses only components of currently available quality with exception of G1 and G2 which must be designed with matched pairs of transistors delivering identical currents I so that the phase angle for which $\Delta Vk=0$ corresponds to the optimum value $\varphi'=90°$. In the opposite case, the locking would occur at a different value of the phase angle, obtained, on FIG. 3, by a vertical translation of the axis of the abscissa. Nevertheless, it is realized that it is not necessary that these generators should deliver contant currents.

While I have described above the principles of my invention in connection with specific apparatus it is to be clearly understood that this description is made only by way of example and not as a limitation to the scope of my invention.

I claim:

1. A system to synchronize the frequency of a first signal to the frequency of a second signal comprising:
- a phase lock loop having a given frequency range within which the frequency of said first signal can be synchronized to the frequency of said second signal including
  - a voltage controlled oscillator generating said first signal,
  - a source of said second signal and
  - first means coupled to said oscillator and said source to produce a first control signal proportional to the phase relationship between said first and second signals for frequency control of said oscillator to establish the desired synchronized condition; and
- an automatic frequency acquisition circuit including
  - second means coupled to said oscillator and said source to produce a second control signal indicative of the relationship of the frequency of said first signal and said given frequency range, and
  - third means coupled to said first means and said second means responsive to said first and second control signals to produce at least a third control signal when said second control signal indicates the frequency of said first signal is outside said given frequency range, said third control signal varying the magnitude of said first control signal to sweep the frequency of said first signal through said given frequency range to enable said phase lock loop to establish said desired synchronized condition;
  - said third means producing said third control signal when the frequency of said first signal is less than the lower frequency limit of said given frequency range and a fourth control signal when the frequency of said first signal is equal to or greater than the upper frequency limit of said given frequency range, said third control signal increasing the magnitude of said first control signal to increase the frequency of said first signal and said fourth control signal decreasing the magnitude of said first control signal to decrease the frequency of said first signal;
  - said third means including

- a bistable device having its supply voltage supplied by said second control signal and its trigger voltage supplied by said first control signal, said third control signal being produced when said device is triggered to its "0" state and said fourth control signal being produced when said device is triggered to its "1" state.

2. A system to synchronize the frequency of a first signal to the frequency of a second signal comprising:
- a phase lock loop having a given frequency range within which the frequency of said first signal can be synchronized to the frequency of said second signal including
  - a voltage controlled oscillator generating said first signal,
  - a source of sai dsecond signal, and
  - first means coupled to said oscillator and said source to produce a first control signal proportional to the phase relationship between said first and second signals for frequency control of said oscillator to establish the desired synchronized condition; and
- an automatic frequency acquisition circuit including
  - second means coupled to said oscillator and said source to produce a second control signal indicative of the relationship of the frequency of said first signal and said given frequency range, and
  - third means coupled to said first means and said second means responsive to said first and second control signals to produce at least a third control signal when said second control signal indicates the frequency of said first signal is outside said given frequency range, said third control signal varying the magnitude of said first control signal to sweep the frequency of said first signal through said given frequency range to enable said phase lock loop to establish said desired synchronized condition;
  - said first means including
    - first gate means coupled to said oscillator and said source responsive to the presence of said first and second signals to produce an output therefrom,
    - second gate means coupled to said oscillator and said source responsive to the presence of said second signal and the absence of said first signal to produce an output therefrom,
    - integrating means to produce said first control signal,
    - first current generating means coupled between said first gate means and said integrating means triggered by an output from said first gate means to increase the magnitude of said first control signal to establish said desired synchronized condition, and
    - second current generating means coupled between said second gate means and said integrating means triggered by an output from said second gate means to decrease the magnitude of said first control signal to establish said desired synchronized condition.

3. A system to synchronize the frequency of a first signal to the frequency of a second signal comprising:
- a phase lock loop having a given frequency range within which the frequency of said first signal can be synchronized to the frequency of said second signal including
  - a voltage controlled oscillator generating said first signal,
  - a source of said second signal, and
  - first means coupled to said oscillator and said source to produce a first control signal proportional to the phase relationship between said first and second signals for frequency control of said oscillator to establish the desired synchronized condition; and an automatic frequency acquisition circuit including second means coupled to said oscillator and said source to produce a second control signal indicative of the relationship of the frequency of said first signal and said given frequency range, and third means coupled to said first means and said second means responsive to said first and second control signals to produce at least a third control signal when said second control signal indicates the frequency of said first signal is outside said given frequency range, said third control signal varying the magnitude of said first control signal to sweep the frequency of said first signal through said given frequency range to enable said phase lock loop to establish said desired synchronized condition;

said second means including differentiator and clipper means coupled to said source to provide an output pulse therefrom time coincident with a given portion of said second signal, integrating means to produce said second control signal, and gate means coupled to said oscillator, said differentiator and clipper means and said integrating means responsive to the presence of said output pulses and the absence of said first signal to increase the magnitude of said second control signal to indicate that the frequency of said first signal is outside said given frequency range.

4. A system to synchronize the frequency of a first signal to the frequency of a second signal comprising:

a phase lock loop having a given frequency range within which the frequency of said first signal can be synchronized to the frequency of said second signal including a voltage controlled oscillator generating said first signal, a source of said second signal, and first means coupled to said oscillator and said source to produce a first control signal proportional to the phase relationship between said first and second signals for frequency control of said oscillator to establish the desired synchronized condition; and an automatic frequency acquisition circuit including second means coupled to said oscillator and said source to produce a second control signal indicative of the relationship of the frequency of said first signal and said given frequency range, and third means coupled to said first means and said second means responsive to said first and second control signals to produce at least a third control signal when said second control signal indicates the frequency of said first signal is outside said given frequency range, said third control signal varying the magnitude of said first control signal to sweep the frequency of said first signal through said given frequency range to enable said phase lock loop to establish said desired synchronized condition;

said third means including voltage divider means coupled between said first means and ground having a pair of output taps therealong to provide two voltages in response to said first control signal, inverter means coupled to one of said pair of output taps, and bistable means coupled to said second means to utilize said second control signal as its supply voltage, the "0" input of said bistable means being coupled to said inverter means to utilize the output therefrom as a first triggering voltage and the "1" input of said bistable means being coupled to the other of said pair of output taps to utilize the output therefrom as a second triggering voltage, said first triggering voltage triggering said bistable means to its "0" state to provide said third control signal when the frequency of said first signal is less than the frequency of the lower limit of said given frequency range and said second triggering voltage triggering said bistable means to its "1" state to provide a fourth control signal when the frequency of said first signal is equal to or greater than the frequency of the upper limit of said given frequency range.

5. A system to synchronize the frequency of a first signal to the frequency of a second signal comprising:

a phase lock loop having a given frequency range within which the frequency of said first signal can be synchronized to the frequency of said second signal including a voltage controlled oscillator generating said first signal, a source of said second signal, and first means coupled to said oscillator and said source to produce a first control signal proportional to the phase relationship between said first and second signals for frequency control of said oscillator to establish the desired synchronized condition; and an automatic frequency acquisition circuit including second means coupled to said oscillator and said source to produce a second control signal indicative of the relationship of the frequency of said first signal and said given frequency range, and third means coupled to said first means and said second means responsive to said first and second control signals to produce at least a third control signal when said second control signal indicates the frequency of said first signal is outside said given frequency range, said third control signal varying the magnitude of said first control signal to sweep the frequency of said first signal through said given frequency range to enable said phase lock loop to establish said desired synchronized condition;

said second means including differentiator and clipper means coupled to said source, first integrating means to produce said second control signal, and first gate means coupled to said oscillator, said differentiator and clipper means, and said first integrating means responsive to the presence of output from said differentiator and clipper means and the absence of said first signal to provide an input to said first integrating means;

said third means including voltage divider means coupled to ground at one end thereof having a pair of output taps therealong, inverter means coupled to one of said pair of output taps, and bistable means coupled to said first integrating means to utilize said second control signal as its supply voltage, the "0" input of said bistable means being coupled to said inverter means to utilize the output therefrom as a first triggering voltage and the "1" input of said bistable means being coupled to the other of said pair of output taps to utilize the output therefrom as a second triggering voltage; and said first means including second gate means coupled to said oscillator, said source and the "1" output of said bistable means responsive to the presence of said first and second signals and the absence of output from said "1" output of said bistable means to produce an output therefrom, third gate means coupled to said oscillator, said source and the "0" output of said bistable means responsive to the presence of said second signal, the absence of said first signal and the absence of output from said "0" output of said bistable means to produce an output therefrom, second integrating means having its output coupled to the other end of said voltage divider means and said oscillator to produce said first control signal, first current generating means coupled between said second gate means and said second integrator means triggered by an output from said second gate means to charge said second integrator means, and second current generating means coupled between said third gate means and said second integrator means triggered by an output from said third gate means to discharge said second integrator means.

6. A system according to claim 5, wherein each of said first and second integrating means include a capacitor having one terminal connected to ground, and a high input impedance amplifier connected to the other terminal of said capacitor.

7. A system according to claim 5, wherein each of said first, second and third gate means include an inhibit gate.

8. A system according to claim 7, wherein each of said first and second integrating means include a capacitor having one terminal connected to ground, and a high input impedance amplifier connected to the other terminal of said capacitor.

References Cited

UNITED STATES PATENTS 2,541,454 2/1951 White et al. ----------- 331—4

ROY LAKE, Primary Examiner

SIEGFRIED H. GRIMM, Assistant Examiner

U.S. Cl. X.R.

331—18, 27